United States Patent [19]
Smallhorn et al.
[11] Patent Number: 4,576,204
[45] Date of Patent: Mar. 18, 1986

[54] LAMINAR FLOW ELEMENT

[75] Inventors: Edward A. Smallhorn; John B. Oliver, both of Dartmouth, Canada

[73] Assignee: Her Majesty the Queen in right of Canada, as represented by the Minister of National Defence, Ottawa, Canada

[21] Appl. No.: 587,830

[22] Filed: Mar. 9, 1984

[30] Foreign Application Priority Data

Aug. 31, 1983 [CA] Canada ........ 435,759

[51] Int. Cl.[4] ........ F16L 1/02; F16L 1/06

[52] U.S. Cl. ........ 138/44; 138/40; 138/108

[58] Field of Search ........ 138/40, 44, 108

[56] References Cited

U.S. PATENT DOCUMENTS

| | | | |
|---|---|---|---|
| 67,614 | 8/1867 | Trees | 138/40 X |
| 155,936 | 10/1874 | Fell | 138/40 X |
| 578,311 | 3/1897 | Blessing | 138/44 X |
| 2,610,300 | 9/1952 | Walton et al. | 138/40 X |
| 3,220,256 | 11/1965 | Weichbrod | 138/44 X |
| 3,749,122 | 7/1973 | Gold | 138/44 X |
| 4,031,913 | 6/1977 | Apellaniz | 138/44 X |
| 4,484,472 | 11/1984 | Licinit et al. | 138/40 |

FOREIGN PATENT DOCUMENTS

| | | | |
|---|---|---|---|
| 540878 | 11/1941 | United Kingdom | 138/40 |
| 2060937 | 5/1981 | United Kingdom | 138/40 |

*Primary Examiner*—James E. Bryant, III
*Attorney, Agent, or Firm*—Murray, Whisenhunt & Ferguson

[57] ABSTRACT

A laminar flow element for use in a cylindrical fluid flow passage for restricting the flow of fluid through that passage to a constant volume flow rate. The element comprises a body portion having a cylindrical peripheral surface of predetermined length and predetermined diameter, with the surface defining with the passage an annular, tubular fluid passageway. Locating portions are provided extending from the element for engagement with at least one surface in the cylindrical passage for maintaining the peripheral surface concentrically disposed within the cylindrical passage. The length and diameter of the element are dimensioned so that the flow is laminar under all operating conditions, and therefore the volume rate of flow of fluid through the passage is linearly proportional to the pressure drop along the annular passage.

5 Claims, 4 Drawing Figures

LAMINAR FLOW ELEMENT

This invention relates to a laminar flow device.

BACKGROUND OF THE INVENTION

Laminar flow devices are devices which have been developed for the purpose of providing constant volume flow in apparatus which require the latter for proper operation. As the name suggests, they are based on the characteristic of fully developed, steady laminar flow of fluid through a passage wherein the actual volume rate of flow is linearly proportional to the pressure differential per unit length of the passage.

Heretofore, laminar flow devices have taken the form of a multiplicity of small diameter tubes of equal length disposed in parallel relation in an appropriate fluid passage. A typical device would consist of approximately 23 tubes. It can be shown that, for a given flow rate, the length of the tubes is proportional to the fourth power of the inside diameter of the tubes. Accordingly, in order to maintain the device as short and compact as possible, it is necessary to use very small diameter tubes. The smallest readily available brass tubes have an inside diameter of 0.02 inches. In order to obtain fully developed, steady laminar fow in the tubes, the ratio of the length to inside diameter must be at least 200 and thus the length of the tubes must be at least 4 inches. It has been found that not only is the above minimum length excessively long, the task of assembling the large number of tubes in position requires excessive skill and this increases manufacturing cost. There is a need therefore for a more compact and easily manufactured and assembled laminar flow device.

SUMMARY OF THE INVENTION

The present invention provides a laminar flow element which is believed to meet the aforementioned objective in that it can be made substantially shorter for a given diameter, has few parts, is readily manufactured by conventional processes and is easily assembled.

In essence, the present invention provides a laminar flow device which is based upon flow through an annular space rather than through a multiplicity of tubes.

The laminar flow element of the present invention is adapted for use in a cylindrical fluid flow passage and has a peripheral cylindrical surface concentrically disposed within the passage so as to define an annular fluid flow passage therewith. The element includes means engageable with at least one surface in the passage for maintaining the peripheral surface concentrically disposed within the passage. The annular fluid passage is formed with a length and gap so as to provide steady, fully developed, laminar flow at the outlet of the annular passage for a given pressure drop along the length thereof.

BRIEF DESCRIPTION OF THE DRAWINGS

These and other features of the invention will become more apparent from the following description in which reference is made to the appended drawings, wherein.

DESCRIPTION OF A PREFERRED EMBODIMENT

Figures 1, 2, 3, 4:
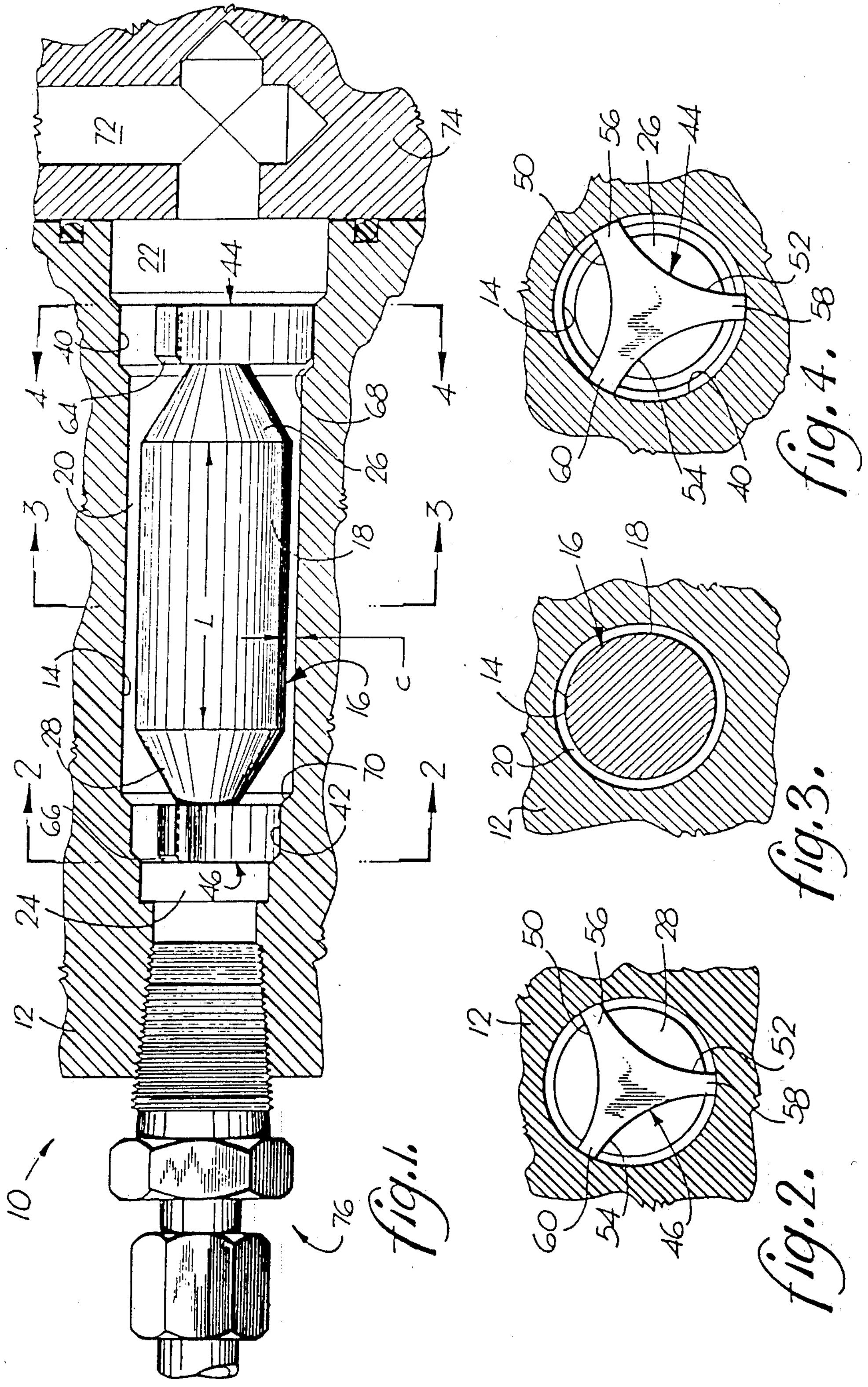
FIG. 1 is a longitudinal cross-sectional view of an embodiment of the invention.
FIGS. 2, 3 and 4 are transverse cross-sectional views taken along lines 2—2, 3—3 and 4—4 respectively of FIG. 1.

FIGS. 1-4 illustrate a preferred embodiment of the invention. The device, generally designated by reference numeral 10, is comprised of an outer body member or housing 12 having an internal, cylindrical bore 14 and a unitary inner body member 16, having an outer cylindrical surface 18 concentrically disposed within bore 14. Bore 14 and surface 18 together define an annular flow passage 20 having a length, L, corresponding to the parallel portions of the bore and surface, and an annular space, c. The housing is formed with an axial fluid inlet 22 for admitting fluid at a pressure $P_1$ into fluid passage 20 and an axial fluid outlet 24 for discharging fluid at a pressure $P_2$ from passage 20.

The outer body member may form an integral part of the equipment in which the laminar flow element is required or it may be a separate component which is adapted to be secured to the equipment in any suitable manner.

The device 10 also includes means for reducing head losses at the inlet and outlet ends of passage 20 and means for concentrically mounting and maintaining the inner body member within the housing.

The means for reducing head losses and generally improving fluid flow characteristics at the passage inlet and outlet includes tapered sections 26 and 28 formed at the opposed ends of surface 18. Sections 26 and 28 extend axially away from surface 18 and inwardly thereof toward the axis of the inner body member. A conical taper has been deemed adequate for the purposes of the present invention particularly inasmuch as it can be readily manufactured. However, other shapes may be used if so desired.

The means by which the inner body member is concentrically located and secured to the housing includes two concentric cylindrical surfaces or bores 40 and 42, one machined at either end of bore 14 of the housing, and two locating portions 44 and 46 formed at the opposed ends of the inner body member for interference fit engagement with surfaces 40 and 42, respectively.

Each locating portion is essentially in the form of a disc concentrically machined into the inner body member and has three arcuate, equally spaced recesses 50, 52 and 54 machined therein to define three locating lobes 56, 58 and 60. The outer surfaces of the lobes are dimensioned to form an interference fit with its corresponding bore in the housing. The three recesses define fluid passages connecting the housing inlet or outlet with annular passage 20.

In order to facilitate insertion of the inner body member into the housing, bore 42 and locating portion 46 are formed with diameters which are smaller than that of bore 14 while bore 40 and locating portion 44 are formed with diameters which are larger than that of bore 14. In addition, chamfers 64 and 66 are formed at the leading edges of the lobes of locating portions 44 and 46, respectively, and chamfers 68 and 70 are formed between bores 40 and 14 and 14 and 42 respectively. While the device could be formed for insertion of the inner body member through the outlet end of the housing, it is preferably inserted into the housing in the direction of flow so that fluid pressure assists in maintaining the inner body member in position or, conversely, does not tend to urge the inner body member out of position.

Inlet and outlet porting may be of any conventional form and could consist of internal passages 72 formed in an adjoining part 74 or external piping and fittings generally indicated by numeral 76 in FIG. 1.

Provided that close tolerances are prescribed, it is possible to provide a very small annular gap and this, in turn, results in a relatively short device. Both parts may be machined very accurately using automatic or conventional equipment and are readily assembled simply by press fitting the inner body member into the housing. Thus, assembly is a simple operation which does not require special tooling or jigs.

The length L and annular gap c are determined from the equations for fluid flow and Reynolds number (Re) for an annular space, which are as follows:

$$Q = \frac{\pi D c^3}{12 \mu L} (P_1 - P_2) \quad (1)$$

where:

Q is the volume flow rate;
D is the minor diameter of the annular space;
$\mu$ is the absolute viscosity;
c is the radial width of the annular gap;
L is the axial length of the annular space;

and:

$$Re = \frac{\rho Q}{\mu \pi D} \quad (2)$$

where: $\rho$ is the density of the fluid.

In order to provide laminar flow for a flow rate of 2.5 liters per minute, a coventional laminar flow device would require 23 tubes each having an inside diameter of 0.02 inches and a length of 6.5 inches. The outside diameter of the assembly of tubes would be 0.25 inches.

For the same flow rate, a laminar flow element constructed in accordance with the present invention would require a 0.26 inch diameter bore 14, a 0.25 inch diameter surface 18 and a length, L, of 0.575 inches. The total length of the inner body member would be slightly longer in order to accommodate tapered sections 26 and 28 and the locating portions. Nevertheless, the total length would be significantly less than that of a conventional laminar flow device.

It will be appreciated that various modifications and alterations may be made to the above-described device without departing from the spirit of the invention defined in the following claims.

The embodiments of the invention in which an exclusive property or privilege is claimed are defined as folows:

1. A laminar flow element for use in a cylindrical fluid passage for providing a constant volume rate of flow through said passage for a predetermined pressure differential range across said element, said element comprising:

a primary body portion having a cylindrical peripheral surface of predetermined length and predetermined diameter, said surface defining with said cylindrical fluid passage an annular fluid passage when said body portion is disposed in said cylindrical fluid passage;

fluid directing means extending axially from opposite ends of body portion for smoothly directing fluid flow in said cylindrical fluid passage to and from said annular passage, said fluid directing means including a tapered body portion extending axially from each end of said primary body portion, each tapered body portion having a base adjacent said primary body portion;

maintaining means extending from said element for engaging with a surface in said cylindrical fluid passage for maintaining said peripheral surface concentrically disposed within said cylindrical fluid passage, said maintaining means including a disc-shaped body portion extending axially from an end of each said tapered body portion remote from said primary body portion, each said disc-shaped body portion having axial fluid passage means extending therethrough for communicating said cylindrical fluid passage and said annular passage;

said predetermined length and said predetermined diameter being dimensioned such that fluid passes through said annular passage at a volume rate of flow which is linearly proportional to a pressure drop along said annular passage.

2. A laminar flow element as defined in claim 1, wherein said maintaining means includes at least three axial ribs at each end of said body portion.

3. A laminar flow device, comprising:

an annular fluid flow passage;

a fluid inlet for admitting fluid at a first pressure to one end of said passage;

a fluid outlet for discharging fluid at a second pressure from the other end of said passage;

a first body member including an internal cavity having a cylindrical surface, said fluid inlet opening into one end of said cavity and said fluid outlet opening into the other end of said cavity;

a second body member having an axis and an external cylindrical surface concentrically disposed within said cavity, said external cylindrical surface and said cavity defining said annular fluid passage, said second body member being unitary and having concentric tapered surface portions extending axially from each end of said external cylindrical surface towards said axis;

locating means extending radially outwardly from an end of each tapered portion remote from said external cylindrical surface for engaging with said cavity for maintaining said second body member concentrically disposed within said internal cavity, said locating means having fluid passage means for permitting fluid flow between said annular fluid passage and said inlet and said outlet, said locating means being dimensioned to form an interference fit with said cylindrical surface in said internal cavity;

retaining means for axially retaining said second body member within said first body member;

said annular fluid flow passage having a length and an annular space such that for small pressure differentials between said inlet and said outlet, flow of fluid between said inlet and said outlet is a fully developed steady laminar flow.

4. A laminar flow element as defined in claim 3, wherein each said locating means is disc-shaped, and has a cylindrical surface receivable in a cylindrical surface in said cavity in interference fit relation, and wherein each locating means has fluid passage means therein permitting fluid flow axially through said locating means.

5. A laminar flow element as defined in claim 4, wherein said fluid passage means is defined in part by recesses in said cylindrical surface of each said locating means.

* * * * *